July 28, 1959 M. ROSENBERG 2,897,482

MAGNETIC CORE MEMORY SYSTEM

Filed Sept. 2, 1954 3 Sheets-Sheet 1

MILTON ROSENBERG
INVENTOR.

BY Lyon & Lyon

ATTORNEYS

July 28, 1959 M. ROSENBERG 2,897,482

MAGNETIC CORE MEMORY SYSTEM

Filed Sept. 2, 1954 3 Sheets-Sheet 2

MILTON ROSENBERG
INVENTOR.

BY Lyon & Lyon

ATTORNEYS

MAGNETIC CORE MEMORY SYSTEM

Filed Sept. 2, 1954 3 Sheets-Sheet 3

MILTON ROSENBERG
INVENTOR.

BY Lyon & Lyon

ATTORNEYS

United States Patent Office
2,897,482
Patented July 28, 1959

2,897,482

MAGNETIC CORE MEMORY SYSTEM

Milton Rosenberg, Santa Monica, Calif., assignor, by mesne assignments, to Telemeter Magnetics, Inc., a corporation of California Application September 2, 1954, Serial No. 453,863

6 Claims. (Cl. 340—174)

This invention relates to magnetic memory systems of the type utilizing magnetic cores and, more particularly, is an improvement in magnetic memory construction.

A magnetic core memory which employs toroidal cores having substantially rectangular hysteresis characteristics has been described previously in articles such as that by J. W. Forrester, entitled Digital Information Storage In Three Dimensions Using Magnetic Cores, which is found in the Journal of Applied Physics, volume 22, pages 44–48, January 1951. The cores are arranged in columns and rows and are excited by means of a separate row coil which is coupled to each row of cores and by means of a separate column coil which is coupled to each column of cores. Excitation of a row coil and a column coil results in a single one of the cores which is coupled to both receiving the additive effects of the excitation of both and, accordingly, being the sole core driven thereby. The polarity to which the core is driven determines whether a "1" or a "0" is being stored. Reading of the condition of a core in which information of this type has been stored is performed with a reading coil. This is a coil which is coupled to every core in the memory. Excitation of a row and column coil to drive a single desired core to one given polarity, say P, has the following results. If the core is already in P, substantially no voltage is induced in the reading coil as a result of the drive applied to the core. If the selected core is in N, it is driven to P and a substantial voltage is induced in the reading coil indicative of that fact. Thus the information stored in the core is read.

To be driven to saturation, a selected core has applied to it from the row and column an excitation which exceeds a critical minimum. The cores which are coupled only to the excited row coil or only to the excited column coil receive less than this critical minimum and are not driven to saturation. However, the partially driven non-selected cores are driven around a minor hysteresis loop and do induce as a result unwanted voltages in the reading coil. It will be appreciated that with an increase in the size of the memory there are more cores in the rows and columns. Therefore, the unwanted voltages soon attain such proportions as to mask any reading voltage. Thus there is a limit to the size of a useful memory which is not very large. Various attempts have been made to buck out these unwanted voltages by checkerboarding the reading winding—that is, reversing the sense of the reading winding on every core in a column or on cores in adjacent columns with the result that a good deal of minimization of the unwanted signals was obtained. The difficulty in constructing a memory using checkerboarding for the reading winding is considerable. The reading winding is usually the most difficult and time consuming to apply. Because of the small size and close spacing of the cores, the operator threading the reading winding oftentimes skips cores or commits errors in winding sense and thus nullifies to a marked degree any benefits to be derived. The expense involved is commensurate with the difficulty in construction.

A feature of the present invention is a new and improved reading coil construction which substantially eliminates unwanted reading voltages.

Another feature of the present invention is the provision of a reading coil which is extremely simple to wind.

Still another feature of the present invention is the provision of a novel, useful, and inexpensive magnetic core memory construction.

These and other features of the invention are provided in a magnetic matrix memory having the cores arrayed in rows and columns. The columns for this particular memory are of the folded type wherein half the cores are aligned adjacent to the other half and each column coil is coupled to both halves of a column, the sense of the coupling to one half being opposite to the sense of the coupling to the other half.

The reading coil consists of a winding on each core having the same sense. The windings on the cores in each half column are connected in series to form series-connected column windings. Alternate ones of the series-connected column windings are connected together at one end. Adjacent ones of the series-connected column windings are connected together at the other end, the other ends of the first and last series-connected column windings being free for the purposes of obtaining an output therefrom. Thus, there is provided a re-entrant type of reading coil wherein any voltages induced as a result of partial drives as a result of the reading winding configuration and the drives have such polarity that they buck each other out.

Another embodiment of the invention employs the same arrangement for connecting together the windings in each column of cores—that is, one end of alternate ones of the series-connected column windings are connected together. The first and last series-connected column windings have their other ends free for the derivation of an output therefrom. The other ends of the next to the first and next to the last series-connected column windings are connected together. Alternate ones of the other ends of the series-connected column windings are connected together. In this manner, a reading coil is formed in which unwanted voltages are cancelled.

In two other embodiments of the invention, the half-columns of cores are disposed in two planes which are parallel to each other. The column coils pass through the half-columns of cores in one plane in one sense and the half-columns of cores in the other plane in the other sense. The reading coils are formed in substantially the same manner as they were when the half-columns are in the same plane, by connecting in series the windings on each core in each column. It will be appreciated that the half-columns of cores in one plane correspond to the alternate columns of cores in the previously described single-plane arrangement for all the cores. The half-columns of cores in the opposite parallel plane correspond to the remaining half-columns of cores in the single-plane arrangement. Interconnection of the reading coil between the planes is made in identical fashion as interconnection of the reading coil for the single plane.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

Figure 1:
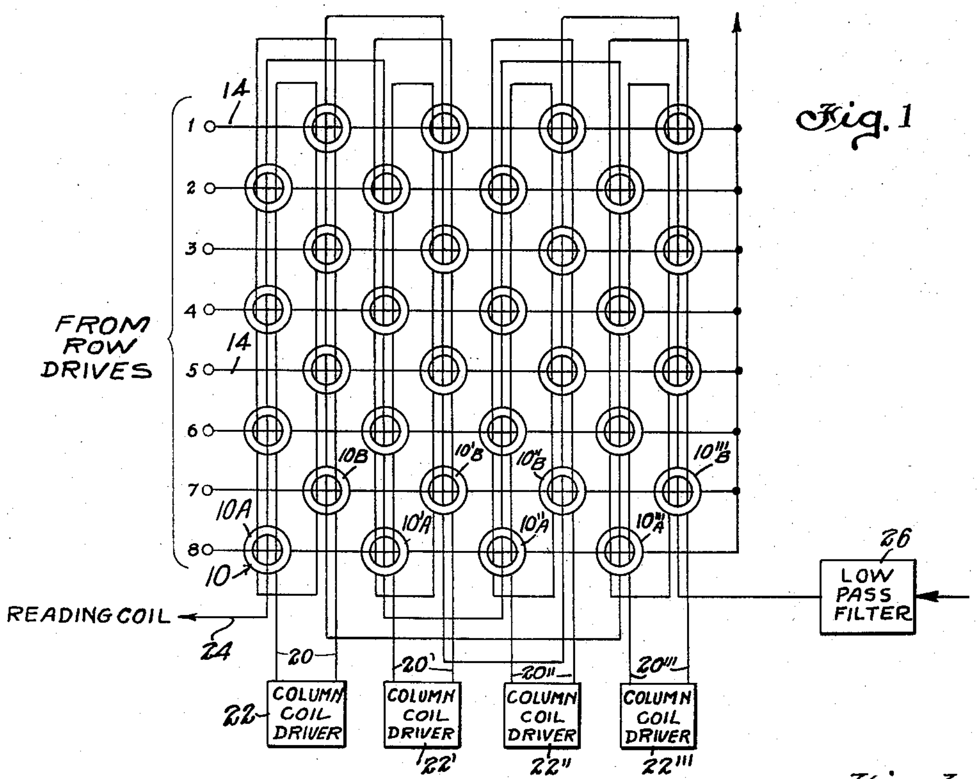
Figure 1 shows an embodiment of the invention in an arrangement of toroidal cores in a folded-column array.
Figure 5:
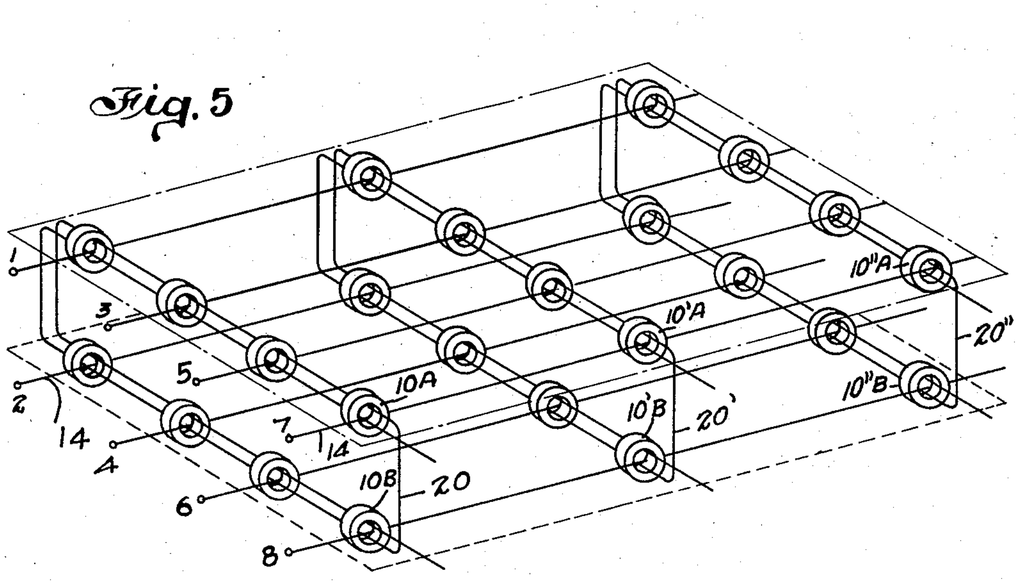
Figure 5 shows an arrangement of folded columns of cores in two planes.

Referring now to Figure 1, there may be seen by way of example a 32-core folded-column type of memory array such as is shown, described, and claimed in an application for a Magnetic Memory Device by Raymond Stuart-Williams et al., filed August 9, 1954, Serial Number 448,603, assigned to this assignee. A folded column consists of a column of cores 10 in which one-half of the cores 10A in a column are positioned either adjacent to the other half of the cores 10B, if the memory is one wherein all the cores in a digit plane are to be in the same plane or the cores which form one-half of a column are in one plane and the cores in the other half of the column are in a second parallel plane adjacent thereto. This latter arrangement is shown in Figure 5. Figure 1 is a single-plane arrangement. A column coil 20 is formed by threading wire to form a coil through the openings in the toroidal cores. The sense of the coupling to the cores of the winding may be made the same for the cores in both halves of the columns or, as preferred and shown here, the sense of the winding may be different for the cores in one-half of a column than it is with the cores in the other half of the column. This can be followed by noting that each column coil 20 threads up through the cores in the left half 10A of a folded column and down through the cores in the right half 10B of a folded column. Thereby, when a current is applied to a column coil from a current driver 22, it creates a field which tends to drive the left half cores 10A in one sense and the right half cores 10B in the opposite sense. The row coils 14 are passed through the cores in each row in the same sense. However, the excitation of a selected column coil is applied with a sense to co-operate with the excitation being applied from a row coil to a selected core. This means programming the direction of column-coil drive to be applied to a half-column which includes a selected core. Since a column-coil current must be in either one direction or the other to achieve polarity reversals of any of the cores coupled thereto, there is very little in the way of extra equipment required. In any event, it can be seen that the core memory construction is extremely simple thus far.

Also shown in Figure 1 is the reading coil 24 for the memory exemplifying one embodiment of the invention. The reading coil, as shown, has a single turn coupled to each one of the cores. More than one turn may be made, if desired. The single turn is coupled to each one of the cores with the same sense. A low-pass filter 26 is inserted in series with the reading coil in order to eliminate any high-frequency ringing which may occur. This reading coil is shown schematically and separately in Figure 3, and its detailed construction is given in connection with Figure 3. The memory plane shown in Figure 1 may be used alone or in conjunction with the other memory planes to form a three-dimensional array in accordance with known techniques. Furthermore, the size may be extended to any desired number of cores.

Figure 2:
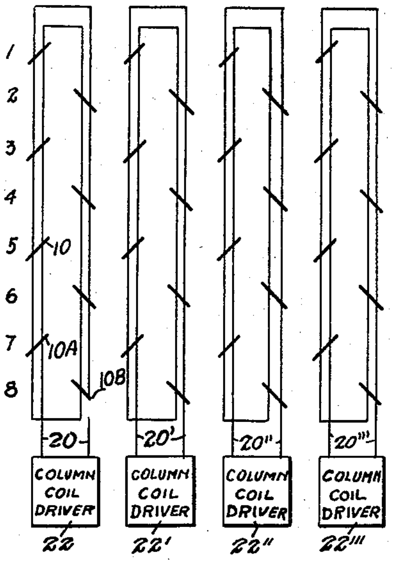
Figure 2 is the same arrangement using a schematic representation for the cores and the coils in the memory for the purpose of facilitating an explanation of the present invention.

Figure 2 is a schematic arrangement showing the identical matrix as in Figure 1. The magnetic cores 10 are represented by the short, angular lines. The column coils are represented as before. The row coils and reading coil are omitted for simplification. Whether or not a core is coupled to a coil is indicated by the angular line crossing the coil. Thus the fact that the cores in one-half of a column are coupled to a column coil in a different sense than the other half of the column is represented by the opposite acute angles made by the angular lines.

Figure 3:
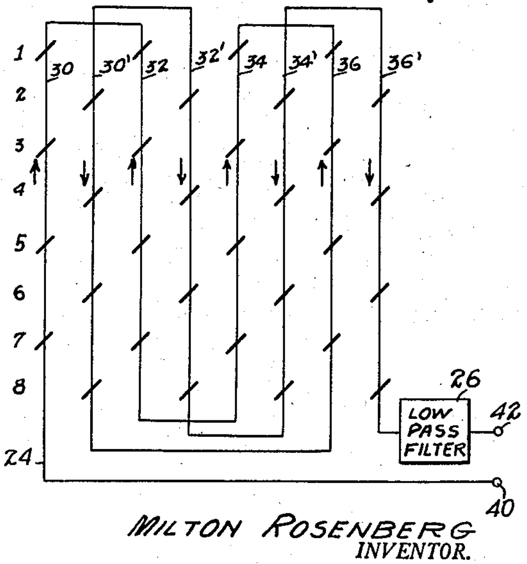
Figure 3 is a schematic of the embodiment of the invention shown in Figure 1.

Figure 3 is a schematic of the embodiment of the invention shown in Figure 1. For the puropose of simplifying the drawing, the row and column coils are omitted. Only the reading coil 24 is shown coupled to the cores of a folded-column array. The reading coil consists of a winding on each core having the same coupling sense which is connected in series with the windings on other cores in the half-column to form series-connected half-column windings 30, 30′, 32, 32′, 34, 34′, 36, 36′. One end of alternate ones of series-connected half-column windings are connected together, i.e., 30—32, 30′—32′, 34—36, 34′—36′. The other end of the second 30′ and next to last one 36 of the series-connected half-column windings are connected together, and the other end of alternate ones of the series-connected column windings are connected together, i.e., 32—34, 32′—34′. Thus, if a current were applied to the reading coil from terminal 40, it would go up half-column winding 30, down half-column winding 32, up half-column winding 34, down half-column winding 36, back and up through half-column winding 30′, down half-column winding 32′, up half-column 34′, down half column 36′, through low-pass filter 26, and ending at terminal 42. It will be appreciated that the pattern of the reading coil laid down here can be extended to a matrix having any size.

Assume now that a row coil is excited with a less-than-critical amplitude current drive. The cores in a row are all driven in minor hysteresis loops in the same direction. The voltages and resulting current flow induced in the reading coil will either all have the polarity shown by the arrows or will all have a polarity diametrically opposite. In either event, it can be readily appreciated that in view of the manner of coupling and interconnecting the reading coil these all cancel each other. Assume that one of the column coils is excited. It will be recalled that in view of the coupling of a column coil, half the cores of the folded column receive a drive having one polarity and the other half receive a drive having the opposite polarity. From this it can be seen that the half-driven cores of any folded column induce voltages which are substantially equal and opposite and therefore cancel. The arrows for any two half-columns coupled to a single-column coil are indicative of the relative polarity of the induced currents. Therefore, when a selected core is driven, the unwanted voltages in the reading coil substantially cancel out. The process of winding the reading coil is extremely simple. The windings on each core are threaded in the same sense throughout and are brought out to terminals at either end of the core array. Here the terminals are interconnected either by wire or by using printed circuit techniques in the manner described for the ends of the series-connected half-column windings. The simplicity of the reading-coil construction, as well as the remainder of the memory, should be apparent. The checkerboarding effect is a double one, obtained for both row- and column-coil excitations.

Figure 4:
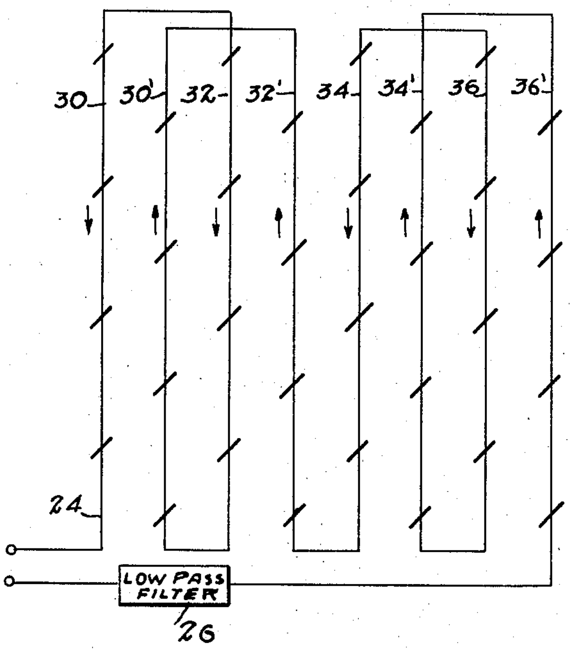
Figure 4 is a second embodiment of the invention.

Figure 4 is a schematic of another single-planar embodiment of the invention. The cores are disposed in half-columns and rows, as shown in Figure 1, with the same row- and column-coil interconnections. However, for simplicity only the reading coil is shown. The reading coil again consists of a winding coupled in the same sense to each core. As previously, at one end of the series-connected half-column windings, alternate ones thereof 30—32, 30′—32′, 34—36, 34′—36′ are connected together. At the other end, adjacent ones of the series-connected half-column windings 30′—32, 32′—34, 34′—36 are connected together. Accordingly, the reading winding goes up through half-column 30, down through half-column 32, up through half-column 30′, down through half-column 32′, up through half-column 34, down through 36, up through 34′, and down through 36′. A low-pass filter 26 is connected in series with the reading winding to suppress any effects due to unwanted high-frequency ringing. The arrows shown adjacent the columns have the same significance as in Figure 3. Considering the effects of driving a row coil or a column coil, it is seen that substantial cancellation of unwanted voltages is obtained with this embodiment of the invention also. Again, construction of the reading coil and thereby the memory is extremely simple, series-connected column windings being brought out at both ends of the half-columns, whereby they may be readily connected in the manner shown, using wire interconnections or printed-circuit techniques.

Figure 5 is a view in perspective of three folded columns 10A, 10B, 10'A, 10'B, 10''A, 10''B, wherein half the cores are in one plane and the second half of the column of cores are in another parallel plane. The column winding goes through the cores 10A in the upper plane in one sense and through the cores 10B in the lower plane in the opposite sense whereby, upon excitation of the column coil, the cores in the upper plane are partially driven toward saturation at one polarity and the cores in the lower plane are partially driven toward saturation in the opposite polarity. Also shown are the row coils 14. There are only three folded columns shown, in order to preserve simplicity in the drawing. It will be appreciated that as many more columns and rows of cores as are desired may be employed in the construction of this memory plane.

Figure 6:
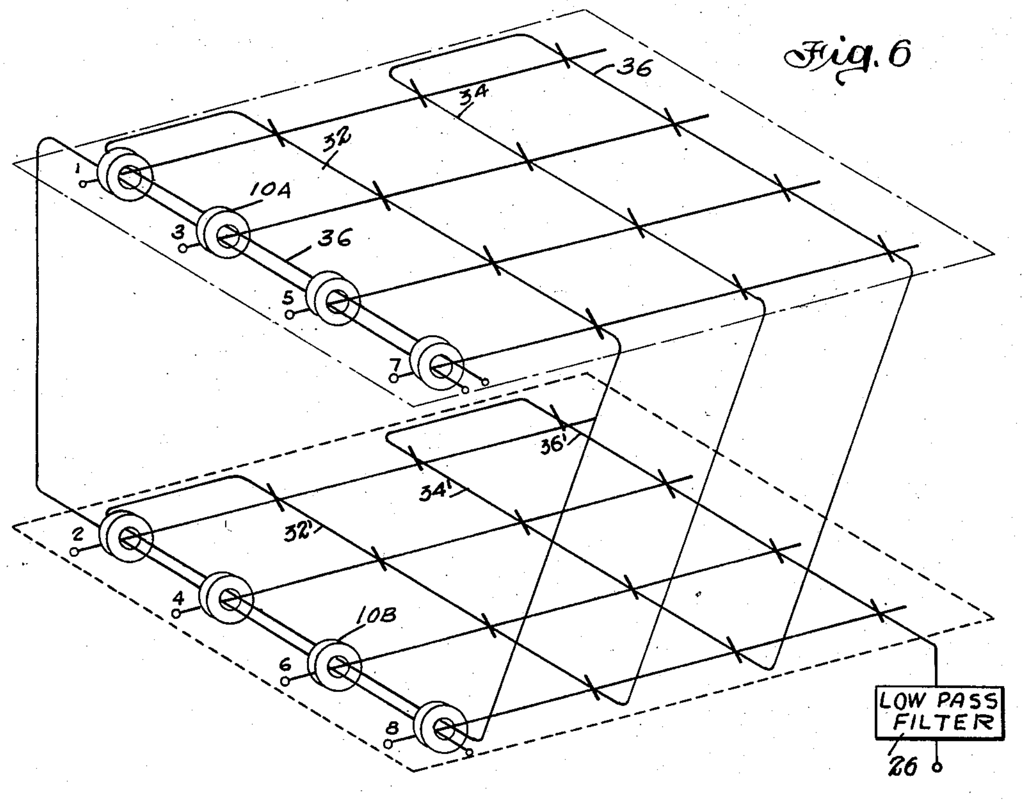
Figures 6 and 7 are schematics of two-plane folded-column arrangements of embodiments of the invention.

Figure 6 is a schematic arrangement of folded columns of cores using substantially the same symbols as are shown in Figure 2. The row and column coils are shown for the first column of cores. Thereafter, they are omitted and only the reading coil is shown, in order to preserve simplicity in the drawing. Upper and lower planes respectively containing the half-columns of cores represented by the slant lines are shown. The omitted row and column coils would be coupled to the cores in the manner shown in Figure 5. The reading coil 24 consists of a winding coupled to each of the cores with the same sense. As the columns of cores in each of the planes are correspondingly numbered, it will be seen that in each plane at one end adjacent series-connected half-column windings are connected together. At the other end, the series-connected half-column winding in one plane is connected to the other end of a succeeding series-connected half-column winding in the other plane. Thus lower half-column 30' is connected to upper half-column 32, lower half-column 32' is connected to upper half-column 34, etc. A low-pass filter is connected to the reading coil to achieve suppression of unwanted high-frequency ringing. Upon careful consideration, it will be seen that the reading-coil winding plan shown in Figure 6 is substantially that shown in Figure 4 except, of coure, that the half-columns are separated into two planes, or vertically, instead of being in one plane. The analysis given for Figure 4 applies here identically.

Figure 7:
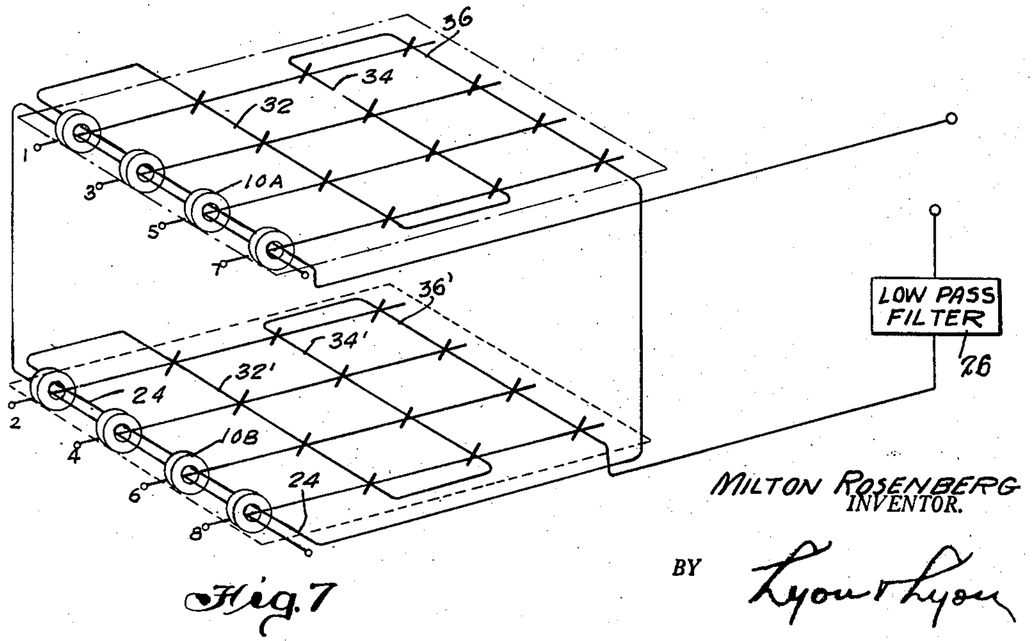

Regarding Figure 7, a schematic of the two-planar counterpart of Figure 3 may be seen. Again, row and column coils for the first column of cores is shown. Thereafter, they are omitted, and only the reading coil is shown. The reading coil 24 in Figure 7 includes again a winding coupled in the same sense to each core. The windings are connected in series to form series-connected half-column windings in each plane. Each plane has adjacent ones of the series-connected half-column windings in the plane connected together at one end. The other end of the first half-column series-connected windings 30' in one plane is connected to the last of the series-connected half-column windings 36 in the other plane. The remaining "other ends" of adjacent columns in each plane are connected together. As previously stated, Figure 7 is the two-planar counterpart of Figure 3, and the discussion of Figure 3 applies here. Any reading operation results in unwanted signal voltages being substantially cancelled, thus enabling the extension of a memory to any desired size. A 32,768-bit matrix memory has been built using the techniques described herein, and a wanted-to-unwanted signal ratio of better than 10:1 has been obtained.

Accordingly, there has been shown and described a novel, useful, simple reading-coil construction which effectuates substantial cancellation of unwanted signal voltages, thus enabling extremely large magnetic matrix memory construction. It will be noted that although the embodiment of the invention has described using folded columns, the columns need not be "folded"—that is, with half the cores adjacent to the other half in a column. The cores may still be physically positioned in one straight column, and the inventive techniques described herein may still be employed without violating the spirit and scope of the invention or the claims.

I claim:

1. In a magnetic matrix memory system of the type including a plurality of cores of magnetic material having substantially rectangular hysteresis characteristics said cores being arranged in columns and rows, each column of cores being folded over with one-half the cores in the column being adjacent the other half of the cores in a column while the cores are maintained in the same discrete row alignment as would exist with nonfolded columns of cores, a plurality of row coils each of which is connected to all the cores in a different row, a plurality of column coils each of which is inductively coupled to all the cores in a different one of said columns, a column coil being coupled to one-half the cores in a column with a sense opposite to that with which it is coupled to the cores in the other half of said column the improvement consisting of a reading coil comprising a winding in the same sense on every core the windings in every half-column of cores being connected in series to form series-connected half-column windings, means coupling together one end of alternate ones of said series-connected half-column windings, and means coupling the other ends of said series-connected half-column windings to form a single reading coil for said memory wherein unwanted voltages are substantially cancelled.

2. In a magnetic matrix memory system of the type including a plurality of cores of magnetic material having substantially rectangular hysteresis characteristics, said cores being arranged in columns and rows in each of two parallel planes with each column having one-half of the cores thereof in each of said two parallel planes, a plurality of column coils, each of which is inductively coupled to all the cores in a different half column in each of said two parallel planes in an opposite relative sense, a plurality of row coils each of which is inductively coupled to all the cores in a different row in one of said planes in the same sense, the improvement consisting of a reading coil comprising in each of said parallel planes a winding on each core having the same sense, the windings in each half-column being connected in series, each two adjacent half-column windings in a plane being connected together at one end, and means coupling the other ends of said series-connected windings in and between said parallel planes to obtain substantial cancellation of unwanted voltages responsive to excitation of a column coil and a row coil.

3. In a magnetic matrix memory system of the type including a plurality of cores of magnetic material having substantially rectangular characteristics, said cores being arranged in columns and rows in each of said two parallel planes, said columns in each plane being correspondingly numbered in sequence, a plurality of column coils each of which is inductively coupled to all the cores in correspondingly numbered columns in each of said two parallel planes, said column coils being coupled to the cores in one of said planes with a sense opposite to the coupling to the cores in the other of said two planes, a plurality of row coils each of which is inductively coupled to all the cores in a different row, the improvement consisting of a reading coil comprising in each of said parallel planes a winding on each core having the same sense, the windings in each half-column being connected in series, means connecting at one end each two adjacent series-connected half-column windings, and means connecting the other end of each of said series-connected half-column windings in one plane to the other end of the series-connected half-column windings in said other plane having the next larger number in sequence.

4. In a magnetic matrix memory system of the type including a plurality of cores of magnetic material having substantially rectangular hysteresis characteristics, said cores being arranged in columns and rows in each of two parallel planes, said columns in each plane being correspondingly numbered in sequence, a plurality of column coils each of which is inductively coupled to all the cores in correspondingly numbered columns in each of said two parallel planes, said column coils being coupled to the cores in one of said planes with a sense opposite to the coupling to the cores in the other of said two planes, a plurality of row coils, each of which is inductively coupled to all the cores in a different row, the improvement consisting of a reading coil comprising in each of said parallel planes a winding on each core having the same sense the windings in each half-column being connected in series, means connecting at one end each two adjacent series-connected half-column windings, means connecting the other end of one of said two series-connected half-column windings to the other end of one of the next two adjacent series-connected half-column windings to form a reading coil in each plane which successively progresses through the sequence of columns, and means connecting one end of the series-connected half-column winding of the first column in one plane to one end of the series-connected half-column winding of the last column to form a single series-connected reading winding for both planes.

5. In a magnetic matrix memory system of the type including a plurality of cores of magnetic material having substantially rectangular hysteresis characteristics said cores being arranged in columns and rows, each column of cores being folded over with one-half the cores in the column being in a parallel plane and being adjacent the other half of the cores in a column, a plurality of row coils each of which is connected to all the cores in a different row, a plurality of column coils each of which is inductively coupled to all the cores in a different one of said columns, a column coil being coupled to one-half the cores in a column with a sense opposite to that with which it is coupled to the cores in the other half of said column the improvement consisting of a reading coil comprising a winding in the same sense on every core the windings on every half-column of cores being connected in series to form series-connected half-column windings, means connecting alternate ones of said series-connected half-column windings at one end, and means connecting adjacent ones of said series-connected half-column windings at the other end to form a single reading coil for said memory.

6. In a magnetic matrix memory system of the type including a plurality of cores of magnetic material having substantially rectangular hysteresis characteristics said cores being arranged in columns and rows, each column of cores being folded over with one-half the cores in the column being adjacent the other half of the cores in a column while the cores are maintained in the same discrete row alignment as would exist with nonfolded columns of cores, a plurality of row coils each of which is connected to all the cores in a different row, a plurality of column coils each of which is inductively coupled to all the cores in a different one of said columns, a column coil being coupled to one-half the cores in a column with a sense opposite to that with which it is coupled to the cores in the other half of said column the improvement consisting of a reading coil comprising a winding in the same sense on every core the windings on every half-column of cores being connected in series to form series-connected half-column windings, means coupling together one end of alternate ones of said series-connected half-column windings at one end, means coupling a second of said series-connected half-column windings and a next to last of said series-connected half-column windings together at their other end, and means connecting together adjacent ones of said series-connected half-column windings at their other ends whereby a single re-entrant reading coil is formed.

References Cited in the file of this patent

UNITED STATES PATENTS

| | | |
|---|---|---|
| 2,691,156 | Saltz | Oct. 5, 1954 |
| 2,784,391 | Rajchman | Mar. 5, 1957 |

OTHER REFERENCES

"Ferrits Speed Digital Computers," by Brown and Albers-Shoenberg in Electronics Magazine, April 1953 (pages 446–449).

"A Myriabit Magnetic-Core Matrix Memory," by Rajchman in the Proceedings of the IRE, October 1953.